US012496595B2

(12) United States Patent
L'Henaff et al.

(10) Patent No.: US 12,496,595 B2
(45) Date of Patent: Dec. 16, 2025

(54) SHOWERHEAD ASSEMBLY WITH AERATION

(71) Applicant: AS America, Inc., Piscataway, NJ (US)

(72) Inventors: Jean-Jacques L'Henaff, New Canaan, CT (US); Jacob Nitz, London (GB); Paul Flowers, London (GB); Greg Reinecker, Brooklyn, NY (US)

(73) Assignee: AS America, Inc., Piscataway, NJ (US)

( * ) Notice: Subject to any disclaimer, the term of this patent is extended or adjusted under 35 U.S.C. 154(b) by 100 days.

(21) Appl. No.: 18/689,745

(22) PCT Filed: Sep. 8, 2022

(86) PCT No.: PCT/US2022/076144
§ 371 (c)(1),
(2) Date: Mar. 6, 2024

(87) PCT Pub. No.: WO2023/039495
PCT Pub. Date: Mar. 16, 2023

(65) Prior Publication Data

US 2024/0367184 A1 Nov. 7, 2024

Related U.S. Application Data

(60) Provisional application No. 63/242,832, filed on Sep. 10, 2021.

(51) Int. Cl.
*B05B 1/18* (2006.01)
*B05B 12/00* (2018.01)

(52) U.S. Cl.
CPC .............. *B05B 1/18* (2013.01); *B05B 12/002* (2013.01)

(58) Field of Classification Search
CPC ........... B05B 1/18; B05B 12/002; B05B 1/12; B05B 7/0425; A61H 2201/503;
(Continued)

(56) References Cited

U.S. PATENT DOCUMENTS 4,733,818 A 3/1988 Aghnides
7,913,934 B2 3/2011 Schorn
(Continued)

FOREIGN PATENT DOCUMENTS

CN 206853940 U * 1/2018 ........... B05B 7/0425
DE 102006034266 B4 * 2/2017 ........... B05B 7/2491
(Continued)

*Primary Examiner* — Lori L Baker
(74) *Attorney, Agent, or Firm* — Morrison & Foerster LLP

(57) ABSTRACT

Provided are showerheads with aeration that include a showerhead body comprising a front showerhead face comprising a plurality of nozzles and a rear showerhead face opposite the front showerhead face, a air/water mixing chamber located in an interior space of the showerhead body, a ventilation disk comprising a plurality of openings positioned between the front showerhead face and the rear showerhead face, and an actuating mechanism on the rear showerhead face. The actuating mechanism is configured to, when actuated, expose the plurality of openings of the ventilation disk to draw air through the plurality of openings and into the air/water mixing chamber to mix the air with water to form aerated water, and the plurality of nozzles in the front showerhead face are configured to receive the aerated water from the air/water mixing chamber and dispense the aerated water.

18 Claims, 5 Drawing Sheets

(58) Field of Classification Search

CPC .......... A61H 9/0021; A61H 2201/0153; E03C 1/0405; E03C 1/0409; E03C 1/084

USPC .................... 4/615, 596, 567, 670, 620, 903

See application file for complete search history.

(56) References Cited

U.S. PATENT DOCUMENTS

| | | | |
|---|---|---|---|
| 8,807,456 | B2 | 8/2014 | Morbio |
| 8,944,350 | B2 | 2/2015 | Lin |
| 10,589,297 | B2 | 3/2020 | Kajuch |
| 10,799,895 | B2 | 10/2020 | Gong |
| 2014/0054391 | A1 | 2/2014 | Schroeder |

FOREIGN PATENT DOCUMENTS

| | | | | | |
|---|---|---|---|---|---|
| EP | 1827705 | B1 * | 7/2008 | ........... | B05B 3/0422 |
| WO | WO-2023059225 | A1 * | 4/2023 | ............... | B05B 1/18 |

* cited by examiner

418

SHOWERHEAD ASSEMBLY WITH AERATION

CROSS-REFERENCE TO RELATED APPLICATIONS

This application is a U.S. national stage application under 35 U.S.C. § 371 of International Application No. PCT/US2022/076144, filed internationally on Sep. 8, 2022, which claims the benefit of U.S. Provisional Application No. 63/242,832, filed Sep. 10, 2021. The entire contents of each priority application is incorporated herein by reference.

FIELD

The present disclosure generally relates to showerhead assemblies, and in particular, to showerhead assemblies having aeration.

BACKGROUND

Conventional showerhead assemblies distribute a single stream of water (e.g., a mixed stream from a hot water supply and a cold water supply) into a plurality of smaller streams of water. Each stream of water from the plurality of smaller streams exits the showerhead assembly through a single nozzle on the face of the showerhead assembly. By distributing the water to the user in the form of a plurality of smaller streams, a conventional showerhead assembly creates a generally pleasurable showering experience for the user.

SUMMARY

Provided herein are showerhead assemblies with aeration. The aeration in the showerhead assemblies mixes air into the water such that each stream of water exiting the showerhead assembly has a greater volume than that of a showerhead assembly without aeration, due to the air mixed into the stream. A showerhead assembly having aeration can provide an increased pleasurable showering experience for the user. Specifically, the increased volume of each exiting stream can provide a pleasurable sensation that cannot otherwise be achieved with a conventional showerhead assembly without aeration.

The showerhead assembly provided herein include an actuating mechanism that turns the aeration on and off. Thus, the exiting water streams can be controlled by the user, depending on the user's preferences. In some embodiments, the user can actuate the actuating mechanism to turn the aeration feature on. When the aeration feature is on, air will be drawn into the showerhead assembly and mixed with the water. The mixed water and air will then exit the showerhead assembly through a plurality of nozzles in the face of the showerhead assembly. In some embodiments, the user can actuate the actuating mechanism to turn the aeration feature off. When the aeration feature is off, no air will be drawn into the showerhead assembly and mixed with the water. Thus, only water will exit the showerhead assembly, and not air.

In some embodiments, showerhead assemblies provided herein can also allow a user to control various spray settings. The various spray settings refer to the nozzle pattern, stream pattern, and/or the water pressure of the exiting stream. For example, the various spray settings can include a massage setting, a wave massage setting, a drenching setting, and/or a power wash setting.

In some embodiments, a showerhead assembly with aeration is provided, the showerhead assembly comprising: a showerhead body comprising a front showerhead face comprising a plurality of nozzles, and a rear showerhead face opposite the front showerhead face; a water inlet in fluid communication with the showerhead body and configured to receive water from a water supply; an air/water mixing chamber located in an interior space of the showerhead body; a ventilation disk positioned between the front showerhead face and the rear showerhead face, the ventilation disk comprising a plurality of openings lining a circumferential surface of the ventilation disk and configured to draw air into the air/water mixing chamber; and an actuating mechanism on the rear showerhead face, the actuating mechanism configured to, when actuated, expose the plurality of openings of the ventilation disk to draw air through the plurality of openings and into the air/water mixing chamber, wherein the air/water mixing chamber is configured to receive water from the water inlet and mix the water with the air to form aerated water, wherein the plurality of nozzles in the front showerhead face is configured to receive the aerated water from the air/water mixing chamber and dispense the aerated water.

In some embodiments of the showerhead assembly, when the actuating mechanism is not actuated, the plurality of openings of the ventilation disk are not exposed, the air/water mixing chamber is configured to receive only water, and the plurality of nozzles is configured to receive the water from the air/water mixing chamber and eject the water.

In some embodiments of the showerhead assembly, the actuating mechanism is a push button, wherein when the push button is pressed, it exerts a force on the front showerhead face that causes the front showerhead face to separate from the rear showerhead face, exposing the plurality of openings of the ventilation disk.

In some embodiments of the showerhead assembly, the showerhead is configured to dispense according to any of a plurality of spray settings.

In some embodiments of the showerhead assembly, the showerhead assembly comprises a spray setting control positioned on the shaft, wherein the spray setting control is configured to control the spray setting.

In some embodiments of the showerhead assembly, the showerhead assembly comprises a plurality of openings surrounding the actuating mechanism and configured to draw air into the air/water mixing chamber, wherein the plurality of openings are exposed when the actuating mechanism is actuated.

In some embodiments of the showerhead assembly, each opening of the plurality of openings in the ventilation disk is rectangular and has a length of about 0.5-2 millimeters and a width of about 0.5-2 millimeters.

In some embodiments of the showerhead assembly, each opening of the plurality of openings in the ventilation disk is circular and has a diameter of about 0.5-2 millimeters.

In some embodiments of the showerhead assembly, the plurality of nozzles comprises about 10-30 nozzles.

In some embodiments of the showerhead assembly, the plurality of nozzles comprises nozzles of various sizes.

In some embodiments of the showerhead assembly, the plurality of nozzles comprises nozzles of identical size.

In some embodiments of the showerhead assembly, the actuating mechanism comprises a button.

In some embodiments of the showerhead assembly, pressing the button into the showerhead body generates a force that separates the front showerhead face from the showerhead body to expose the plurality of openings of the ventilation disk.

In some embodiments of the showerhead assembly, when the plurality of openings of the ventilation disk are exposed, pressing the front showerhead face inward towards the showerhead body rejoins the front showerhead face with the showerhead body and conceals the plurality of openings of the ventilation disk.

In some embodiments of the showerhead assembly, the plurality of openings of the ventilation disk comprises about 100-200 openings.

In some embodiments of the showerhead assembly, the showerhead comprises a hand shower.

In some embodiments of the showerhead assembly, the showerhead body is one of a circle, oval, rectangle, or rounded rectangular shape.

In some embodiments of the showerhead assembly, the showerhead assembly includes a shaft comprising a proximal end connected to the showerhead body and a distal end comprising the water inlet.

In some embodiments, any one or more of the features, characteristics, or elements discussed above with respect to any of the embodiments may be incorporated into any of the other embodiments mentioned above or described elsewhere herein.

DETAILED DESCRIPTION

Figure 1:
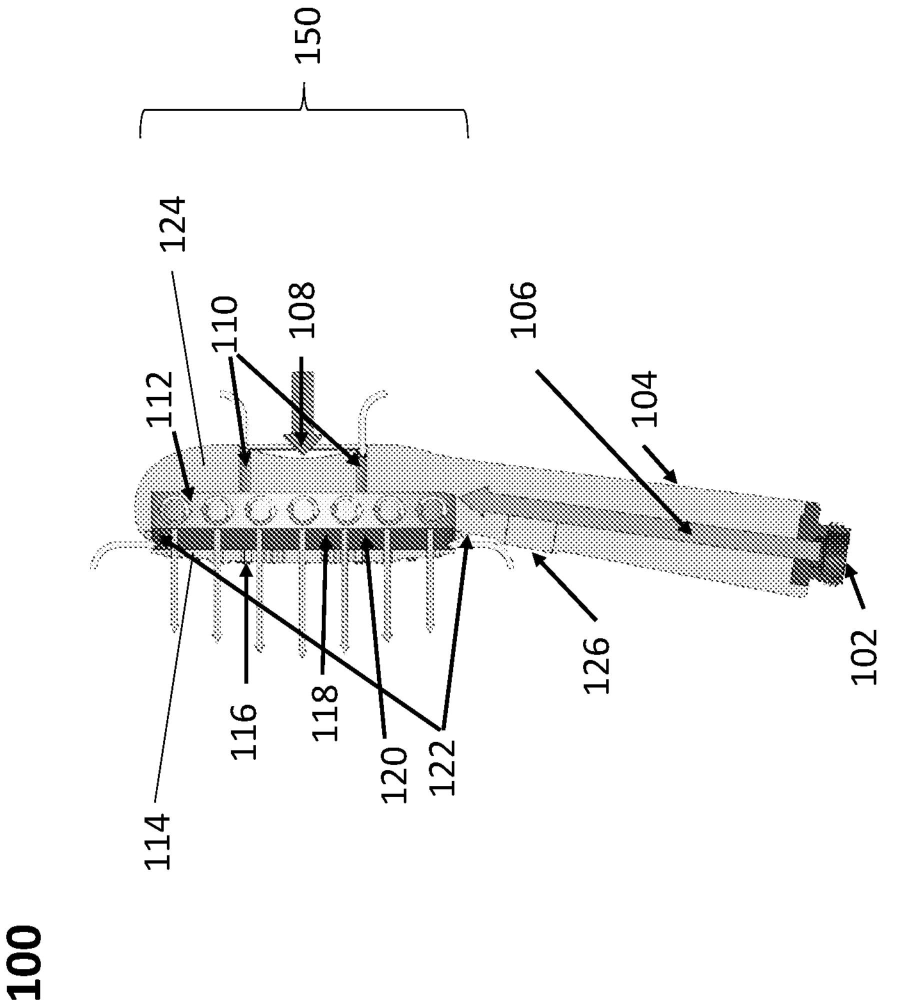
FIG. 1 shows a cross-sectional side view of a showerhead having aeration, indicating where air and water enter the device and mix, according to some embodiments.

Described herein are showerhead assemblies having an aeration mechanism. The aeration mechanism draws air into the showerhead assembly and mixes the air with water from a water supply (e.g., from a hot water and a cold water supply). The showerhead assembly is configured to dispense aerated water to a user from a plurality of nozzles. The aerated water can provide an improved pleasurable showering experience for a user, since each stream dispensed from a nozzle on the face of the showerhead has a greater volume than that of a stream dispensed from a showerhead without aeration. The increased volume of the stream is specifically designed to provide an improved pleasurable showering experience for the user.

The showerhead assemblies provided herein include an aeration mechanism that can be turned on and off by a user, depending on the user's showering preference. The aeration mechanism operates by actuating an actuating mechanism that causes a number of openings to be exposed. The openings allow air to be drawn into the showerhead that can be mixed with water in an air/water mixing chamber of the showerhead. In some embodiments, openings can be located around a ventilation disk positioned between a front face and a rear face of the showerhead. In some embodiments, openings can be located proximate to the actuating mechanism. In some embodiments, the actuating mechanism causes the openings to be exposed when actuated. In some embodiments, the openings are already exposed, but the actuating mechanism causes the openings to open to allow air to be drawn into the showerhead.

Showerhead assemblies having aeration provided herein can also include various spray settings. For example the various spray settings can include a massage setting, a wave massage setting, a drenching setting, and/or a power wash setting. The various shower settings can be selected by the user based on the user's preference.

Referring now to the drawings, like parts are marked throughout the specification and drawings with the same reference numerals, respectively.

FIG. 1 shows a cross-sectional side view of a showerhead assembly 100 having a hose/shower arm connector 102, a shaft 104 comprising a conduit 106, a showerhead body 150 comprising a back showerhead face 124 and a front showerhead face 114 comprising a plurality of nozzles 116, an actuating mechanism 108, an air/water mixing chamber 112, and a control 126 for selecting spray settings.

The front showerhead face 114 is opposite rear showerhead face 124; the two faces can be connected along an outer edge to form an interior space. In some embodiments, the two faces may be connected to a central and circumferential base to form an interior space. Within the interior space, air/water mixing chamber 112 and ventilation disk 118 may be located. Shaft 104 includes a proximal end proximal to the front showerhead face 114 and rear showerhead face 124 and extends away from the faces to a distal end. At the distal end is a water inlet 102 configured to receive water from a water supply. The distal end of shaft 104 may also be configured to removably couple to a hose or other conduit that is connected to a main water supply. Within shaft 104 is a conduit 106 configured to fluidly connect water inlet 102 to air/water mixing chamber 112.

Showerhead assembly 100 may be attached to a shower hose or a shower arm connecting to a water supply at the connector 102. When showerhead assembly 100 is attached as described and the shower is turned on, water flows from the water supply to water inlet 102 located at a distal end of shaft 104, through conduit 106, and into the air/water mixing chamber 112 which is fluidly coupled to conduit 106. From air/water mixing chamber 112, the water may be dispensed from showerhead assembly 100 through a plurality of nozzles 116 located on front showerhead face 114 that are in fluid communication with air/water mixing chamber 112. Note that showerhead assembly 100 can operated without the aeration feature, in which case only water flows through the showerhead assembly 100 and is dispensed from the plurality of nozzles 114. In some embodiments, shaft 104 also functions as a handle, so that users may choose to utilize showerhead assembly 100 in combination with a hose as a hand-held showerhead.

To enable or activate the aeration feature, the user may actuate an actuating mechanism 108. Actuating mechanism 108 can activate and deactivate the aeration feature, or turn the aeration feature on and off. In some embodiments, the actuating mechanism 108 may be may be located on the front showerhead face 114. In some embodiments, the actuating mechanism 108 may be located on the back face 124. In some embodiments, the actuating mechanism 108 may be located on the shaft 104. When actuated, a plurality of openings (or vents) 122 may be exposed. The exposure of the plurality of openings 122 can draw air through the plurality of openings 122 and to air/water mixing chamber

112 to mix with the water. In some embodiments, the water flow through showerhead assembly 100 may draw air through the plurality of openings 122 and to the mixing chamber 112 using an aspirator effect or a Venturi effect.

In some embodiments, the actuating mechanism 108 may include a button that is configured to be pressed into the showerhead when pressed. When pressed (i.e., actuated), the front face 114 may extend outward by the same distance that the button slides inward to expose the plurality of openings 122 of ventilation disk 118. Ventilation disk 118 may be positioned inside an interior space of showerhead assembly 100 between front showerhead face 114 and rear showerhead face 124 when aeration is not actuated. In some embodiments, ventilation disk 118 can include an outer edge 120 having a plurality of openings 122. When aeration is activated (i.e., by way of actuating mechanism 108), the ventilation disk 118 extends outward from its resting position. In some embodiments, when actuated, front showerhead face 114 separates from rear showerhead face 124 to expose the plurality of openings 122 in ventilation disk 118. In some embodiments, when actuated, front showerhead face 114 separates from a circumferential base located between front showerhead face 114 and rear showerhead face 124 to expose the plurality of openings 122 of ventilation disk 118.

In some embodiments, when actuating mechanism 108 is actuated, it causes ventilation disk 118 to extend outward from the showerhead assembly 100 by 0.1-20 mm, 1-10 mm, or 1-5 mm. In some embodiments, the ventilation disk 118 is caused to extend outward from the showerhead assembly 100 by a distance that is less than or equal to 20, 5, 4, 3, or 2 mm. In some embodiments, the ventilation disk 118 is caused to extend outward from the showerhead assembly 100 by a distance that is greater than or equal to 0.1, 1, 2, 3, 4, 5, 10, or 15 mm. When the ventilation disk 118 is exposed, air can enter the showerhead assembly 100 through the openings 122. Openings 122 are configured to receive air from the surrounding environment. The plurality of openings 122 are in fluid communication with air/water mixing chamber 112, such that the air travels through the openings 122 and to air/water mixing chamber 112, In air/water mixing chamber 112, the air can mix with water received by a water inlet 102 located at a distal end of shaft 104 to form aerated water. When water enters water inlet 102 of shaft 104, it can pass through conduit 106 and to air/water mixing chamber 112. As explained above, when the aeration mechanism is activated (i.e., by way of the actuating mechanism 108), the water in the air/water mixing chamber 112 mixes with the air received through the openings 122 to form aerated water. The aerated water may then exit the showerhead assembly through the plurality of nozzles 116 located on the front showerhead face 114 as an aerated spray.

In some embodiments, actuating the actuating mechanism 108 may expose a plurality of openings 110 around the actuating mechanism 108. In some embodiments, actuating the actuating mechanism 108 may involve sliding a switch or a lever. In some embodiments, actuating the actuating mechanism 108 may involve pressing a button, thereby causing the button to extend outward from the showerhead assembly 100. In some embodiments, actuating the actuating mechanism 108 may involve activating a touch-sensitive digital sensor. In some embodiments, the actuating mechanism 108 may be a spring-loaded button which may be configured to retract and extend when pressed, similar to a retractable pen.

In some embodiments, when actuating mechanism 108 is actuated, a plurality of openings 110 surrounding the mechanism 108 may be exposed, allowing air to enter the showerhead assembly 100 through the openings 110 and flow into the air/water mixing chamber 112, where it may mix with the water flowing into the air/water mixing chamber 112 from the conduit, thereby aerating the water. The water may then exit the showerhead assembly 100 through the plurality of nozzles 116 as an aerated spray. A showerhead assembly 100 according to embodiments described herein may include openings 122 surrounding ventilation disk 118, openings 110 surrounding actuating mechanism 108, or both openings 122 and openings 110. In some embodiments, a showerhead assembly 100 according to embodiments described herein may include both openings 122 and openings 110, but may be capable of aerating water by only using one or the other set of openings (and not necessarily both).

In some embodiments, the plurality of openings 122 surrounding ventilation disk 118 may be permanently exposed, and actuating the actuating mechanism 108 (e.g., by activating a touch-sensitive digital sensor) may cause the plurality of openings 122 to open and allow air to enter the showerhead assembly 100. Similarly, in some embodiments, the plurality of openings 110 surrounds actuating mechanism 108 may be permanently exposed, and actuating the actuating mechanism 108 (e.g., by activating a touch-sensitive digital sensor) may cause a plurality of openings 110 around the actuating mechanism 108 to open, allowing air to enter the showerhead assembly 100.

In some embodiments, the aeration may turn off automatically when the user shuts off the water flow to the showerhead assembly. For example, in some embodiments, aeration may turn off automatically when a user shuts off water flow to the showerhead assembly 100 such that, when a user turns the water flow to the showerhead assembly 100 back on, the aeration is off and the user would need to turn the aeration on by way of the actuating mechanism 108. In some embodiments, the user may manually turn off the aeration by pressing the front showerhead face 114 inward such that the ventilation disk 118 returns to a concealed, resting position inside the showerhead assembly 100, thereby covering the plurality of openings 122 and preventing air from entering. In some embodiments turning aeration off may involve disengaging or deactivating actuating mechanism 108, thereby blocking or closing a plurality of openings 110 surrounding the actuating mechanism 108 and/or the plurality of openings 122 surrounding ventilation disk 118.

FIG. 1 also shows a spray setting control 126 with which users can switch between a plurality of spray settings. Note that water can still pass through from the water supply, through the conduit 106, into the air/water mixing chamber 112, and out of the plurality of nozzles 116 even if the aeration is turned off, (i.e., "spray" here does not necessarily imply that the water exiting the plurality of nozzles 106 is aerated). In some embodiments, the spray setting control 126 is located on the shaft 104. In some embodiments, the spray setting control 126 is located on the front showerhead face 114. In some embodiments, the spray setting control is located on the back face 124.

In some embodiments, the spray setting control 126 is a mechanical button. In some embodiments, the spray setting control 126 is a digital sensor that is activated by touch. In some embodiments, the spray setting control 126 may be a dial which rotates between a plurality of positions, each of which correspond to a spray setting. In some embodiments, the spray setting control 126 may be a switch. In some embodiments, said switch may move from left to right between a plurality of positions, each of which correspond to a spray setting. In some embodiments, said switch may move up and down between a plurality of positions, each of which correspond to a spray setting. In some embodiments, the spray setting control 126 may be a lever which can move between a plurality of positions, each of which correspond to a spray setting.

In some embodiments, engaging the spray setting control 126 may change which nozzles of the plurality of nozzles 116 the water exits from, thereby changing the shape of the spray. For example, the water may exit out of nozzles along an outside edge of the face 114 in a first spray setting. In a second spray setting, water may exit out of nozzles only centrally located on the front showerhead face 114. In some embodiments, engaging the spray setting control 126 changes the number of the plurality of nozzles 116 from which the water exits. This may change the pressure of the spray. In some embodiments, engaging the spray setting control 126 changes both the location and the number of the plurality of nozzles 116 from which the water exits. In some embodiments, changing both the location of the nozzles and the number of nozzles that the water exits from can change both the shape and the pressure of the spray. The plurality of spray settings available to the user may include a massage setting, a wave massage setting, a drenching setting, a power wash setting, or the like. In some embodiments, each of the plurality of spray settings may operate using a different spray zone, spray size, and/or spray engine.

In some embodiments, the shape and dimensions of the showerhead body 150 may allow for varying the number and complexity of available spray settings. In some embodiments, the showerhead body 150 may be one of a circle, oval, rectangle, or rounded rectangular shape. In some embodiments, the front showerhead face 114 may be circular having a diameter about 5-50, or about 10-30 cm. In some embodiments, the showerhead body 150 may have a diameter of less than or equal to about 50, about 45, about 40, about 35, about 30, about 25, about 20, about 15, or about 10 cm. In some embodiments, the showerhead body 150 may have a diameter of greater than or equal to about 5, about 10, about 15, about 20, about 25, about 30, about 35, about 40, or about 45 cm. In some embodiments, the showerhead body 150 is rectangular with length less than or equal to about 50, about 45, about 40, about 35, about 30, about 25, about 20, about 15, or about 10 cm. In some embodiments, the showerhead body 150 may be rectangular with a length greater than or equal to about 5, about 10, about 15, about 20, about 25, about 30, about 35, about 40, or about 45 cm. In some embodiments, the showerhead body 150 may be rectangular with a width less than or equal to about 50, about 45, about 40, about 35, about 30, about 25, about 20, about 15, or about 10 cm. In some embodiments the showerhead body 150 may be rectangular and width greater than or equal to about 5, about 10, about 15, about 20, about 25, about 30, about 35, about 40, or about 45 cm.

In some embodiments, one or more of the plurality of spray settings can be used when the aeration mechanism is activated (i.e., when the actuating mechanism 108 is actuated). In some embodiments, all of the available spray settings can be used when the aeration mechanism is activated. In some embodiments, the user may select a preferred spray setting prior to turning on the aeration. In some embodiments, the user may select their preferred spray setting after turning on the aeration. In some embodiments, the aeration and the adjustment of the spray settings are completely independent operations. This can allow a user to change the spray setting without affecting the aeration of the spray, or turn the aeration on or off without affecting the spray setting.

Figure 2:
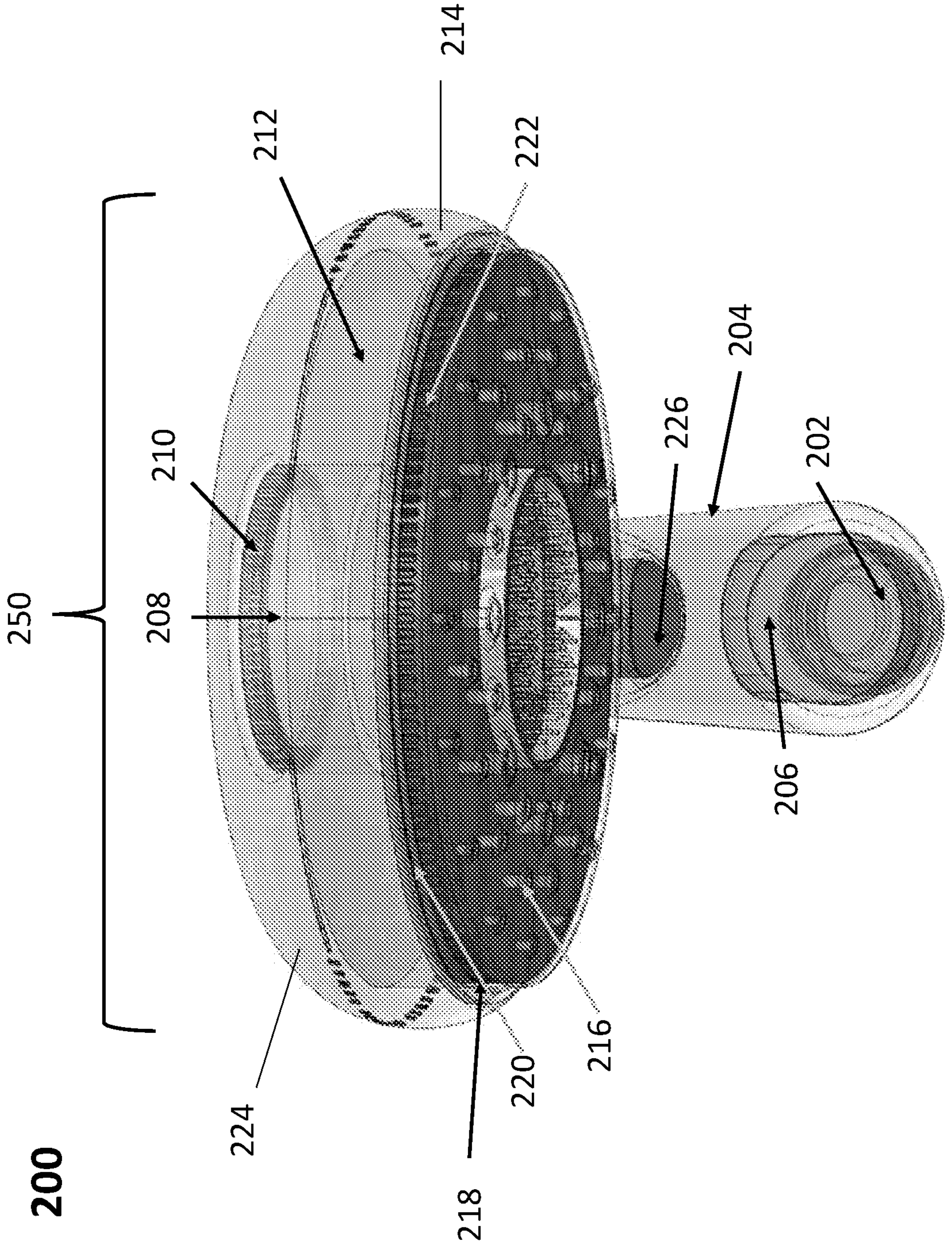
FIG. 2 shows a cross-sectional top view of a showerhead having aeration, according to some embodiments.

FIG. 2 shows a view of a showerhead assembly 200 having a water inlet 202 (which can also serve as a connector), a shaft 204 comprising a conduit 206, a spray setting control 226, a showerhead body 250 comprising a rear showerhead face 224 and a front showerhead face 214 comprising a plurality of nozzles 216, an actuating mechanism 208, an air/water mixing chamber 212, and a ventilation disk 218 comprising a plurality of openings 222 along an outer edge 220 of ventilation disk 218. In some embodiments, actuating mechanism 208 comprises a plurality of openings 210 surrounding the actuating mechanism 208. Showerhead assembly 200 of FIG. 2 may include any of the features described with respect to showerhead assembly 100 of FIG. 1.

In some embodiments, showerhead assembly 200 may comprise about 0-50, about 5-30, or about 10-20 openings 210 surrounding the actuating mechanism 208. In some embodiments, some of the plurality of openings 210 may be functional (i.e., able to take air into the showerhead assembly 200 when aeration is actuated) and some of the plurality of openings 210 may be decorative (i.e., do not perform any function). In some embodiments, about 0-80, about 10-50, or about 20-40% of openings 210 may be decorative. In some embodiments, less than or equal to about 80, about 70, about 60, about 50, about 40, about 30, about 20, about 10, or about 5% of the plurality of openings 210 may be decorative. In some embodiments, greater than or equal to about 5, about 10, about 20, about 30, about 40, about 50, about 60, or about 70% of the plurality of openings 210 may be functional. In some embodiments, the plurality of openings 210 surrounding the actuating mechanism 208 may be arranged in a ring around the actuating mechanism 208. As the percentage of decorative openings increases, the amount of air that can be drawn into showerhead assembly 200 decreases.

The amount of air that can be drawn into showerhead assembly 200 through the openings (e.g., the plurality of openings 210) may be directly dependent on the size and shape of the openings. Specifically, larger openings can allow more air to be drawn into showerhead assembly 200 to form aerated water, and smaller openings can allow less air to be drawn into showerhead assembly 200 to form aerated water. In some embodiments, the openings 210 may be rectangular in shape with lengths of about 0.1-10, about 0.5-5, or about 0.1-1 mm. In some embodiments, the openings 210 may be rectangular in shape with lengths less than or equal to about 10, about 9, about 8, about 7, about 6, about 5, about 4, about 3, about 2, about 1, or about 0.5 mm. In some embodiments, the openings 210 may be rectangular in shape with lengths greater than or equal to about 0.1, about 0.5, about 1, about 2, about 3, about 4, about 5, about 6, about 7, about 8, or about 9 mm. In some embodiments, the openings 210 may be rectangular in shape with widths of about 0.1-10, about 0.5-5, or about 0.1-1 mm. In some embodiments, the openings 210 may be rectangular in shape with widths less than or equal to about 10, about 9, about 8, about 7, about 6, about 5, about 4, about 3, about 2, about 1, or about 0.5 mm. In some embodiments, the openings 210 may be rectangular in shape with widths greater than or equal to about 0.1, about 0.5, about 1, about 2, about 3, about 4, about 5, about 6, about 7, about 8, or about 9 mm.

In some embodiments, the openings 210 may be circular in shape each having a diameter of about 0.1-10, about 0.5-5, or about 0.1-1 mm. In some embodiments, the openings 210 may be circular in shape each having a diameter of less than or equal to about 10, about 9, about 8, about 7, about 6, about 5, about 4, about 3, about 2, about 1, or about 0.5 mm.

In some embodiments, showerhead assembly 200 may comprise about 1-300, about 50-250, or about 100-200 openings 222 surrounding ventilation disk 218. In some embodiments, showerhead assembly 200 may comprise less than or equal to about 300, about 275, about 250, about 225, about 200, about 175, about 150, about 125, about 100, about 75, or about 50 openings 222. In some embodiments, showerhead assembly 200 may comprise more than or equal to about 1, about 25, about 50, about 75, about 100, about 125, about 150, about 175, about 200, about 225, about 250, or about 275 openings 222.

In some embodiments, a portion of the plurality of openings 222 may be functional (i.e., able to take air into the showerhead assembly 200 when aeration is actuated) and some of the plurality of openings 222 may be decorative (i.e., do not perform any function). In some embodiments, about 0-80, about 10-50, or about 20-40% of the openings 222 may be decorative. In some embodiments, less than or equal to about 80, about 70, about 60, about 50, about 40, about 30, about 25, about 20, about 15, about 10, or about 5% the plurality of openings 222 may be decorative. In some embodiments, greater than or equal to about 0, about 5, about 10, about 15, about 20, about 25, about 30, about 40, about 50, about 60, or about 70% of the plurality of openings 222 may be functional.

The amount of air that can be drawn into showerhead assembly 200 through the openings (e.g., the plurality of openings 222) may be directly dependent on the size and shape of the openings. Specifically, larger openings can allow more air to be drawn into showerhead assembly 200 to form aerated water, and smaller openings can allow less air to be drawn into showerhead assembly 200 to form aerated water. In some embodiments, some of the plurality of openings 222 may be rectangular in shape with lengths of about 0.1-10, about 0.5-5, or about 0.1-1 mm. In some embodiments, the openings 222 may be rectangular in shape with lengths less than or equal to about 10, about 9, about 8, about 7, about 6, about 5, about 4, about 3, about 2, about 1, or about 0.5 mm. In some embodiments, the openings 222 may be rectangular in shape with lengths greater than or equal to about 0.1, about 0.5, about 1, about 2, about 3, about 4, about 5, about 6, about 7, about 8, or about 9 mm. In some embodiments, the openings 222 may be rectangular in shape with widths of about 0.1-10, about 0.5-5, or about 0.1-1 mm. In some embodiments, the openings 222 may be rectangular in shape with widths less than or equal to about 10, about 9, about 8, about 7, about 6, about 5, about 4, about 3, about 2, about 1, or about 0.5 mm. In some embodiments, the openings 222 may be rectangular in shape with widths greater than or equal to about 0.1, about 0.5, about 1, about 2, about 3, about 4, about 5, about 6, about 7, about 8, or about 9 mm.

In some embodiments, the openings 222 may be circular in shape each having a diameter of about 0.1-10, about 0.5-5, or about 0.1-1 mm. In some embodiments, the openings 222 may be circular in shape each having a diameter of less than or equal to about 10, about 9, about 8, about 7, about 6, about 5, about 4, about 3, about 2, about 1, or about 0.5 mm.

Figure 3:
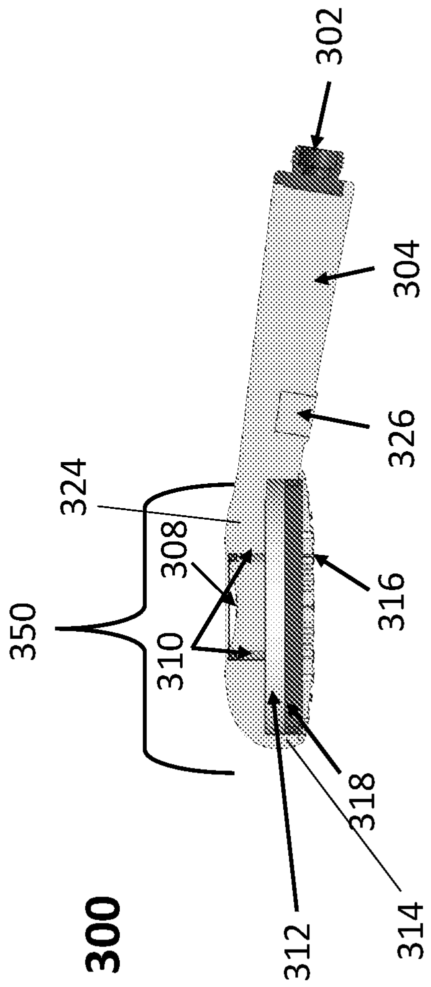
FIG. 3 shows a cross-sectional side view of a showerhead having aeration, according to some embodiments.

FIG. 3 shows a cross-sectional side view of a showerhead assembly 300 comprising a water inlet 302, a shaft 304, a showerhead body 350 comprising a back showerhead face 324 and a front showerhead face 314 comprising a plurality of nozzles 316, a spray selection control 326, an actuating mechanism 308 surrounded by a plurality of holes 310, an air/water mixing chamber 312, a ventilation disk 318. These components may include features of the corresponding components of showerhead assemblies 100 and 200.

Figure 4:
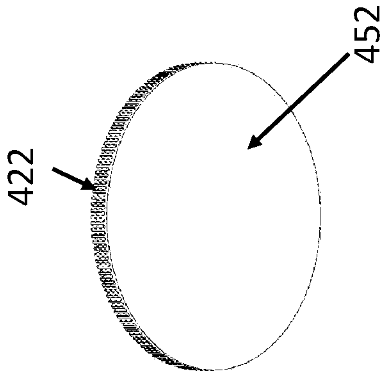
FIG. 4 shows a ventilation disk comprising a plurality of openings for drawing air into a showerhead, according to some embodiments.

FIG. 4 shows a ventilation disk 418 comprising a face 452 and a plurality of openings 422 along an outer circumferential surface. In some embodiments, the face 452 of ventilation disk 418 may comprise openings to allow non-aerated or aerated water to flow from a air/water mixing chamber, through the openings in face 452, and out of the showerhead assembly though a plurality of nozzles in a front face of the showerhead assembly. The openings 422 may include features of the vents 222 of showerhead assembly 200 and/or the vents 122 of showerhead assembly 100.

Figures 5A, 5B:
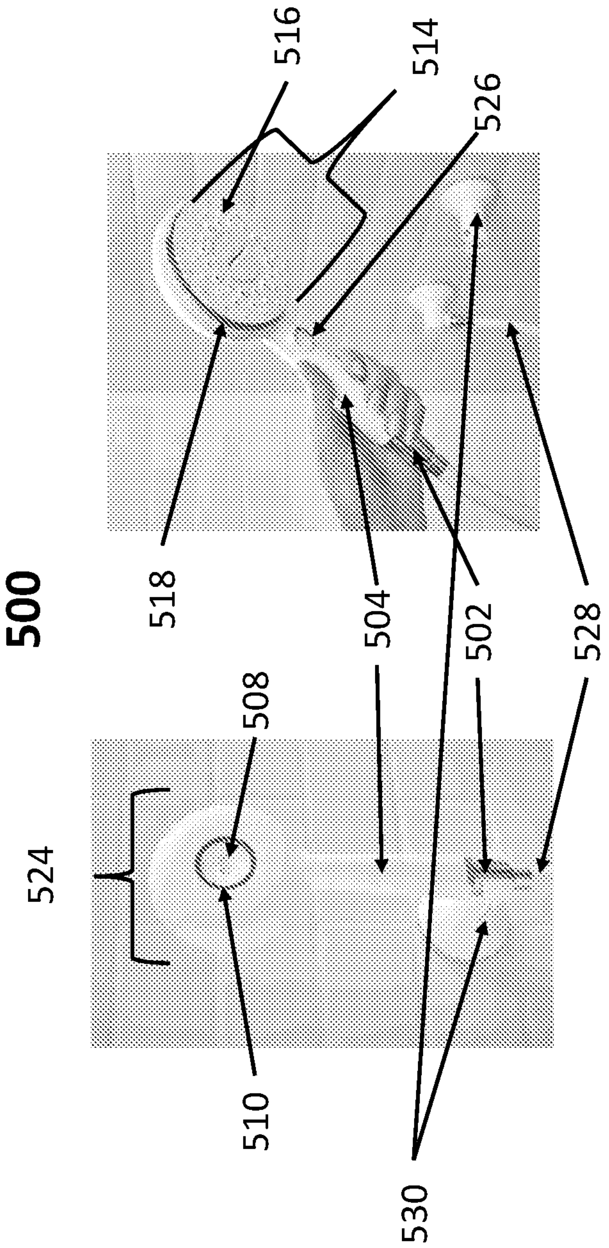
FIGS. 5A and 5B show perspective views of a showerhead having aeration, according to some embodiments.

FIG. 5A shows a rear view of showerhead assembly 500, and FIG. 5B shows a front view of showerhead assembly 500. Showerhead assembly 500 comprises a water inlet 502, a shaft 504, a hose 528, and a wall mount/clasp 530. In some embodiments, showerhead assembly 500 may be handheld (i.e., a hand shower), with the shaft 504 doubling as a handle as illustrated in FIG. 5B. The showerhead assembly can be mounted on the shower wall using the mount/clasp 530. In some embodiments, water inlet 502 may also serve as a hose connector, configured to connect to a hose (e.g., hose 528).

FIG. 5A shows back showerhead face 524 of showerhead assembly 500. As shown in FIG. 5A, the aeration actuating mechanism 508 is in the form of a button 508 surrounded by a ring of openings 510. The button 508 and the plurality of openings 510 may include features of the corresponding components of showerhead assemblies 100, 200, and/or 300.

FIG. 5B shows an embodiment of the front showerhead face 514 of showerhead assembly 500, which includes a spray selection control 526, a ventilation disk 518, and a plurality of nozzles 516. These components may include features of the corresponding components of showerhead assemblies 100, 200, and/or 300. The ventilation disk 518 may include features of the ventilation apparatus 400.

The foregoing description sets forth exemplary systems, methods, techniques, parameters, and the like. It should be recognized, however, that such description is not intended as a limitation on the scope of the present disclosure but is instead provided as a description of exemplary embodiments.

Although the description herein uses terms first, second, etc. to describe various elements, these elements should not be limited by the terms. These terms are only used to distinguish one element from another.

The invention claimed is:

1. A showerhead assembly with aeration comprising:

a showerhead body comprising a front showerhead face comprising a plurality of nozzles, and a rear showerhead face opposite the front showerhead face;

a water inlet in fluid communication with the showerhead body and configured to receive water from a water supply;

an air/water mixing chamber located in an interior space of the showerhead body;

a ventilation disk positioned between the front showerhead face and the rear showerhead face, the ventilation disk comprising a plurality of openings lining a circumferential surface of the ventilation disk and configured to draw air into the air/water mixing chamber; and an actuating mechanism on the rear showerhead face, the actuating mechanism configured to, when actuated, expose the plurality of openings of the ventilation disk to draw air through the plurality of openings and into the air/water mixing chamber, wherein the air/water mixing chamber is configured to receive water from the water inlet and mix the water with the air to form aerated water, wherein the plurality of nozzles in the front showerhead face is configured to receive the aerated water from the air/water mixing chamber and dispense the aerated water.

2. The showerhead assembly of claim 1, wherein when the actuating mechanism is not actuated, the plurality of openings of the ventilation disk are not exposed, the air/water mixing chamber is configured to receive only water, and the plurality of nozzles is configured to receive the water from the air/water mixing chamber and eject the water.

3. The showerhead assembly of claim 1, wherein the actuating mechanism is a push button, wherein when the push button is pressed, it exerts a force on the front showerhead face that causes the front showerhead face to separate from the rear showerhead face, exposing the plurality of openings of the ventilation disk.

4. The showerhead assembly of claim 1, wherein the showerhead is configured to dispense according to any of a plurality of spray settings.

5. The showerhead assembly of claim 1, comprising a spray setting control positioned on the shaft, wherein the spray setting control is configured to control the spray setting.

6. The showerhead assembly of claim 1, comprising a plurality of openings surrounding the actuating mechanism and configured to draw air into the air/water mixing chamber, wherein the plurality of openings are exposed when the actuating mechanism is actuated.

7. The showerhead assembly of claim 1, wherein each opening of the plurality of openings in the ventilation disk is rectangular and has a length of about 0.5-2 millimeters and a width of about 0.5-2 millimeters.

8. The showerhead assembly of claim 1, wherein each opening of the plurality of openings in the ventilation disk is circular and has a diameter of about 0.5-2 millimeters.

9. The showerhead assembly of claim 1, wherein the plurality of nozzles comprises about 10-30 nozzles.

10. The showerhead assembly of claim 1, wherein the plurality of nozzles comprises nozzles of various sizes.

11. The showerhead assembly of claim 1, wherein the plurality of nozzles comprises nozzles of identical size.

12. The showerhead assembly of claim 1, wherein the actuating mechanism comprises a button.

13. The showerhead assembly of claim 1, wherein pressing the button into the showerhead body generates a force that separates the front showerhead face from the showerhead body to expose the plurality of openings of the ventilation disk.

14. The showerhead assembly of claim 1, wherein when the plurality of openings of the ventilation disk are exposed, pressing the front showerhead face inward towards the showerhead body rejoins the front showerhead face with the showerhead body and conceals the plurality of openings of the ventilation disk.

15. The showerhead assembly of claim 1, wherein the plurality of openings of the ventilation disk comprises about 100-200 openings.

16. The showerhead assembly of claim 1, wherein the showerhead comprises a hand shower.

17. The showerhead assembly of claim 1, wherein the showerhead body is one of a circle, oval, rectangle, or rounded rectangular shape.

18. The showerhead assembly of claim 1, wherein the showerhead assembly includes a shaft comprising a proximal end connected to the showerhead body and a distal end comprising the water inlet.

* * * * *